(12) United States Patent
Seki et al.

(10) Patent No.: US 7,568,834 B2
(45) Date of Patent: Aug. 4, 2009

(54) DETECTOR

(75) Inventors: Hidebumi Seki, Tokyo (JP); Hiroyuki Sakai, Tokyo (JP); Tomohiro Rokugawa, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 0 days.

(21) Appl. No.: 11/926,721

(22) Filed: Oct. 29, 2007

(65) Prior Publication Data

US 2008/0165828 A1 Jul. 10, 2008

(30) Foreign Application Priority Data

Oct. 31, 2006 (JP) .............................. 2006-296201

(51) Int. Cl.
*G01K 1/00* (2006.01)
*G01K 13/00* (2006.01)

(52) U.S. Cl. ...................... 374/148; 374/208; 374/147; 374/163

(58) Field of Classification Search ................. 374/147, 374/148, 208, 163
See application file for complete search history.

(56) References Cited

U.S. PATENT DOCUMENTS 4,575,262 A * 3/1986 Andersen .................... 374/147

7,004,623 B2 * 2/2006 Nakagawa et al. .......... 374/158

FOREIGN PATENT DOCUMENTS

| JP | 49-135698 | 3/1948 |
|---|---|---|
| JP | 1-120572 | 8/1989 |
| JP | 4-24018 | 2/1992 |
| JP | 7-218302 | 8/1995 |
| JP | 11-167357 | 6/1999 |
| JP | 2001-303632 | 10/2001 |
| JP | 2003-294561 | 10/2003 |
| JP | 3556046 | 5/2004 |

* cited by examiner

*Primary Examiner*—Gail Verbitsky
*Assistant Examiner*—Mirellys Jagan
(74) *Attorney, Agent, or Firm*—Rankin, Hill & Clark LLP

(57) ABSTRACT

A detector (10) includes: a joint (20) mounted on a fluid pipe; a case (30) mounted on the joint (20) to house a sensor (60); a holder (40) attached to the case (30) and housing a circuit board (70); and a cover (50) attached to the holder (40) and integrated with a light-shielding plate (53). An annular first lug (421), a leaf spring (422) having a projection (423) and a rotation restrainer which projects further from the first lug (421) along an inner circumferential side thereof are integrally formed on the holder (40). An annular first recess (32) to be engaged with the first lug (421) is formed on the case (30). A groove (33) is formed on an inner surface of the first recess. An annular second recess (34) is provided on an inner circumferential side of the first recess (32). A riser portion (35) is provided to a bottom surface thereof.

9 Claims, 8 Drawing Sheets

US 7,568,834 B2

DETECTOR

BACKGROUND OF THE INVENTION

1. Field of the Invention

The present invention relates to a detector mounted on a fluid pipe to measure and display a state quantity of a fluid.

2. Description of Related Art

Fluid pipes for delivering gases and liquids are provided with detectors to measure and display state quantities of fluids such as pressure, temperature, and flow rate.

These types of detectors include a detector portion that detects state quantity of a fluid flowing through the pipe and a display portion that displays the state quantity detected by the detector portion. The detectors need angle adjustments based on the direction of the pipes so as to facilitate viewing of the display portion. Such technique is disclosed in a document, Japanese Patent No. 3556046.

A detector according to this document includes a detector portion, a display portion and a click mechanism that holds the attitude of the display portion at each predetermined angle. The click mechanism has: a plurality of V-shaped grooves (engagement portion) radially provided on the circumference of either one of the display portion or the detector portion around the rotation axis of the display portion; and a ring-shaped leaf spring (engagement piece) on the other one of the display portion and the detector portion, the leaf spring including a V-shaped tongue biased toward and engageable to the engaging portion. The click mechanism allows the angle adjustment of the display portion, where a click feel is generated by the engagement of the V-shaped grooves and the tongue, thereby assisting temporary holding of the display portion. In addition, a stopper projection is provided on the surface of the engagement portion to limit the rotation range. It must be noted that, in the click mechanism, an intermediary joint is inserted into a hollow portion of the display body so that a distal end of a riser portion of the intermediary joint is projected, and the leaf spring is fitted to the distal end of the riser portion that is crimped and fixed.

According to the click mechanism disclosed in the aforementioned document, however, the plurality of V-shaped grooves (engagement portion), radially provided on the display body, and the ring-shaped leaf spring provided with a V-shaped tongue to be engaged with the engagement portion require complicated shape-processing and, consequently, high manufacturing cost.

Further, dedicated jigs are necessary in order to crimp the leaf spring, which increases the manufacturing steps and consequently manufacturing cost. Furthermore, uneven crimping may impair the rotation feel.

Another disadvantage is caused by the leaf spring for angle adjustment of the display, which is configured as a mechanism that moves in vertical direction with respect to the surface of the engagement portion. In order to provide a long tongue sufficient to ensure the resilience of the spring, the engagement portion and hollow portion of the display body have to be large, which necessitates a large space.

The recent demands for downsizing, space-saving, and multifunctionality also favor small detectors.

SUMMARY OF THE INVENTION

An object of the present invention is to provide a compact detector that allows rotation of a display with a simple rotary mechanism.

A detector, according to an aspect of the present invention, includes a joint mounted to a fluid pipe; a case attached to the joint to house a sensor for detecting a fluid that flows in the pipe; a holder attached to the case and provided with a circuit board having a display for displaying a physical quantity of the fluid; and a cover attached to the holder to cover a part of a surface of the circuit board; in which an annular first recess is formed on one of the case and the holder; an annular first lug rotatably engaging with the first recess is formed on the other one of the case and the holder; and the first lug includes a resilient member having a projection projecting radially outward The detector according to the aspect of the present invention measures a state quantity of a fluid delivered through a pipe, which is exemplified by a pressure gauge, a thermometer and a flowmeter.

The detector includes a joint mounted to a pipe, a case for housing a sensor, a holder for housing a circuit board, and a cover for displaying a physical quantity, in which the holder is rotatable with respect to the case. Such an arrangement allows adjustment of the display positioning for easy viewing.

The holder and the case have an annular first lug and recess, of which engagement is kept during rotation. It should be noted that the first recess and the first lug may be provided on either of the holder and the case.

The first lug has a resilient member, which has a projection projecting radially outward with respect to the first lug. The projection may be curved or V-shaped. The resilient member may be rubber, leaf spring, and the like.

Taking advantage of the resilience of the resilient member, the inner wall surface of the first recess is pressed to keep the direction of the display at a desired position, thus enabling angle adjustment of the display position for facilitated viewing. In addition, since no enlargement in size for securing resilience of a leaf spring (one of the problems in the above-mentioned document) is necessary, the space for providing the rotary mechanism can be reduced, which allows size reduction of the product.

In the above arrangement, the first recess is preferably provided with a groove to be fitted with the projection on an inner wall surface thereof.

According to the above arrangement, since a groove is formed on the inner wall of the first recess, the groove and the projection of the first lug can be fitted together to maintain a desired angle. For example, grooves may be configured every ninety degrees so that the holder can with respect to the case be rotated, stopped with a click feel and maintained at every ninety degrees. Since a rotation angle is maintained at the positions of the grooves, a product with excellent usability can be provided.

In the above arrangement, the first recess preferably includes an annular second recess on an inner wall surface thereof, in which the second recess forms a riser portion rising from a bottom surface of the second recess to a bottom surface of the first recess at a part of the circumference thereof, and the first lug is provided with a rotation restrainer projecting toward the bottom surface of the second recess at a part of the inner circumferential side.

According to the above arrangement, when the holder is rotated with respect to the case, the rising portion provided on the second recess collides with the rotation restrainer provided on the first lug to prevent further rotation.

Accordingly, malfunctions, e.g. a twist-derived disconnection of wiring that sends signals from the detecting sensor to the displaying circuit board, can be securely prevented. In addition, since the riser portion and the rotation restrainer are integrally formed on the second recess and the first lug, manufacturing cost can be reduced without employing a dedicated rotation regulator such as an engaging piece.

In the above arrangement, both of the case and the holder preferably include first locking portions fitted with each other over each entire circumference, in which the holder is press-fitted to the case to be attached According to the above arrangement, since the case and the holder include first locking portions that fit with each other, the holder can be attached to the case by one-touch press-fitting.

Accordingly, the locking components can be reduced, and, since dedicated jigs and tools are not required, manufacturing steps can be reduced and manufacturing cost can be reduced.

In the above arrangement, the holder is preferably provided with a circuit board platform and a circuit board fixing lug which are projections of a part of an inner wall, in which the circuit board is put on the circuit board platform and the fixing lug and a notch formed along an outer circumferential side of the circuit board are fitted with each other According to the above arrangement, when the circuit board is put on the circuit board platform, the circuit board fixing lug on the inner wall surface of the holder and the notch on the outer circumference of the circuit board fit together, so that the circuit board is fixed to the holder with respect to the rotary direction to rotate integrally with the holder.

Further, a plurality of pairs of circuit board lugs and notches may be provided, where the size and shape of the pairing lugs and notches may be varied and the plurality of pairs of lugs and notches may be alternately provided. According to the above arrangement, since the circuit board can be assembled only unidirectionally, positioning work can be facilitated and misalignment of the display can be securely avoided.

Conventional methods of fixing a circuit board include, in general, soldering and screwing, and as in JP-A-7-218302, inserting and crimping the circuit board to a dedicated circuit board holder produced beforehand separate from the circuit board. The conventional methods require dedicated jigs and tools, and the increase in the number of manufacturing steps and components have pushed up manufacturing cost. According to the aspect of the present invention, no dedicated circuit board fixing jig or tool is required, so that the number of manufacturing steps and components can be reduced, and manufacturing cost can be reduced.

In the above arrangement, it is preferred that each of the holder and the cover has the fixing lug and the fixing notch to be fitted with each other on each peripheral portion.

According to the above arrangement, a fixing notch and a fixing lug may be formed on either of the holder or the cover. The cover is fixed to the holder with respect to the rotary direction by fitting the fixing notch and lug with each other. Consequently, the cover and the holder rotate in an integrated manner with respect to the case.

Further, a plurality of pairs of circuit board fixing lugs and notches that fit with each other may be provided, where the size and shape of the pairing lugs and notches may be varied and the plurality of pairs of lugs and notches may be alternately provided. According to the above arrangement, since the circuit board can be assembled only unidirectionally, positioning work can be facilitated and misalignment of the display can be securely avoided.

In the above arrangement, it is preferred that a light-shielding plate is integrally formed on the cover.

According to the above arrangement, since the light-shielding plate is integrally formed on the cover, manufacturing cost can be reduced by reducing the number of components and manufacturing steps.

In the above arrangement, each of the case and the holder preferably includes a second locking portion fitted with each other over each entire circumference, in which the cover is press-fitted to the holder to be attached, and the light-shielding plate and the circuit board are closely contacted with each other.

According to the above arrangement, since the case and the holder include the second locking portions that fit with each other, the holder can be attached to the case by one-touch press-fitting. When the cover is attached to the holder, the light-shielding plate comes into close contact with the circuit board, so that the circuit board can be fixed with respect to axial direction of the holder.

Conventionally, in order to fix a light-shielding plate and a circuit board, the light-shielding plate is provided with a nail and the like to be hooked with the circuit board(JP-A-11-167357), which pushed up manufacturing cost through the increase in the numbers of manufacturing steps for providing the light-shielding plate with nails or of components.

According to the above arrangement, no need to use locking components and dedicated jigs and tools reduces the locking components and manufacturing steps, so that manufacturing cost can be reduced.

In the above arrangement, an annular groove is preferably formed on each of the second locking lug of the holder and the second locking notch of the cover which form the second locking portion.

According to the above arrangement, the groove formed on the second locking portion of the holder is formed over the entire circumference, closer to the edge than the second lug of the second locking portion, and the groove formed on the second locking notch of the cover is formed over the entire circumference of the bottom surface of the second locking notch.

Accordingly, when the light-shielding plate presses the circuit board to fix the circuit board, the grooves work to relieve the stress applied on the circuit board.

DETAILED DESCRIPTION OF PREFERRED EMBODIMENT(S)

Figure 1:
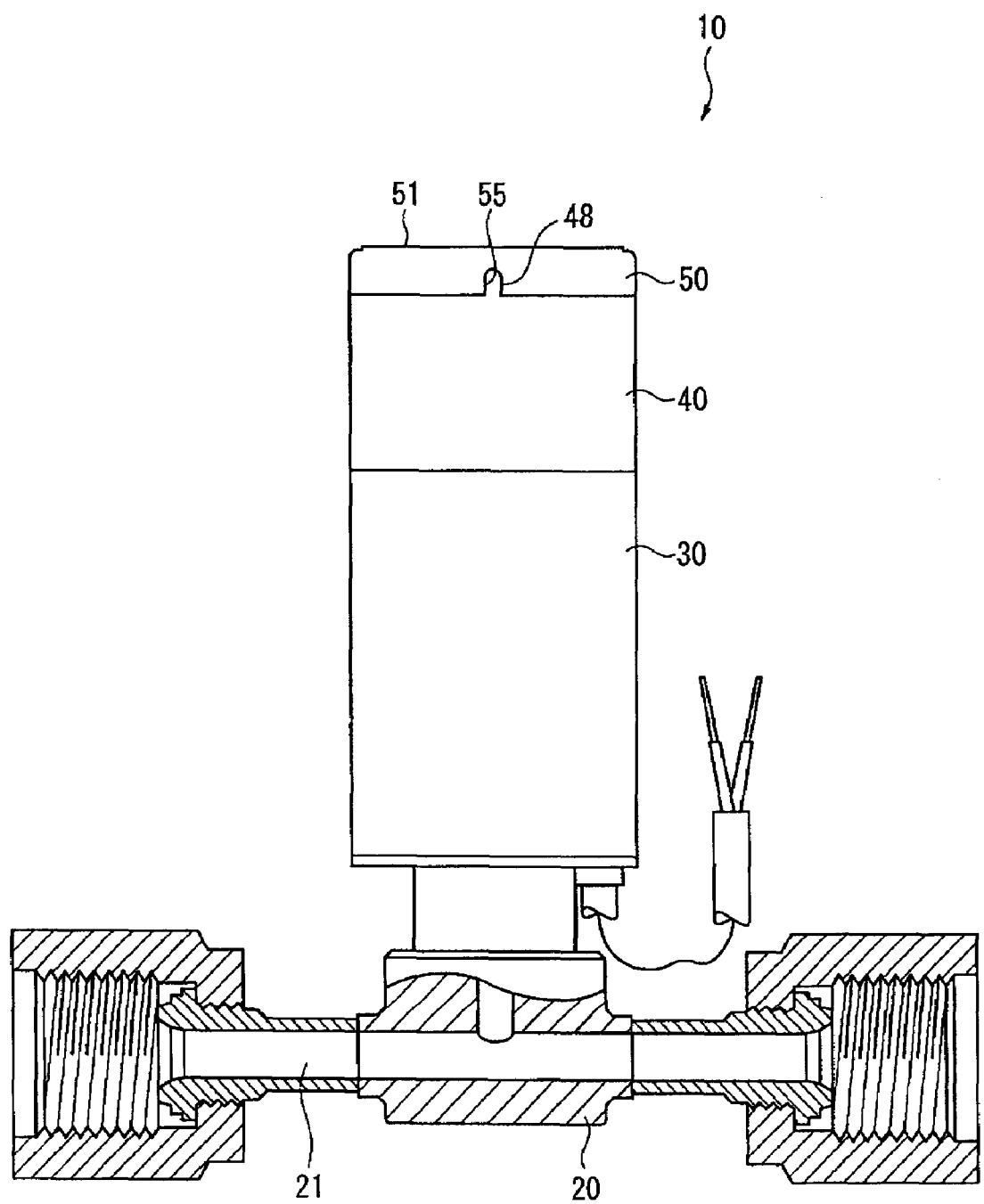
FIG. 1 is a front view showing a detector according to an embodiment of the present invention.

Embodiments of the present invention will be described below with reference to accompanying drawings. Explanation for components with the identical reference numeral is abbreviated or simplified in description of each embodiment.

Figure 2:
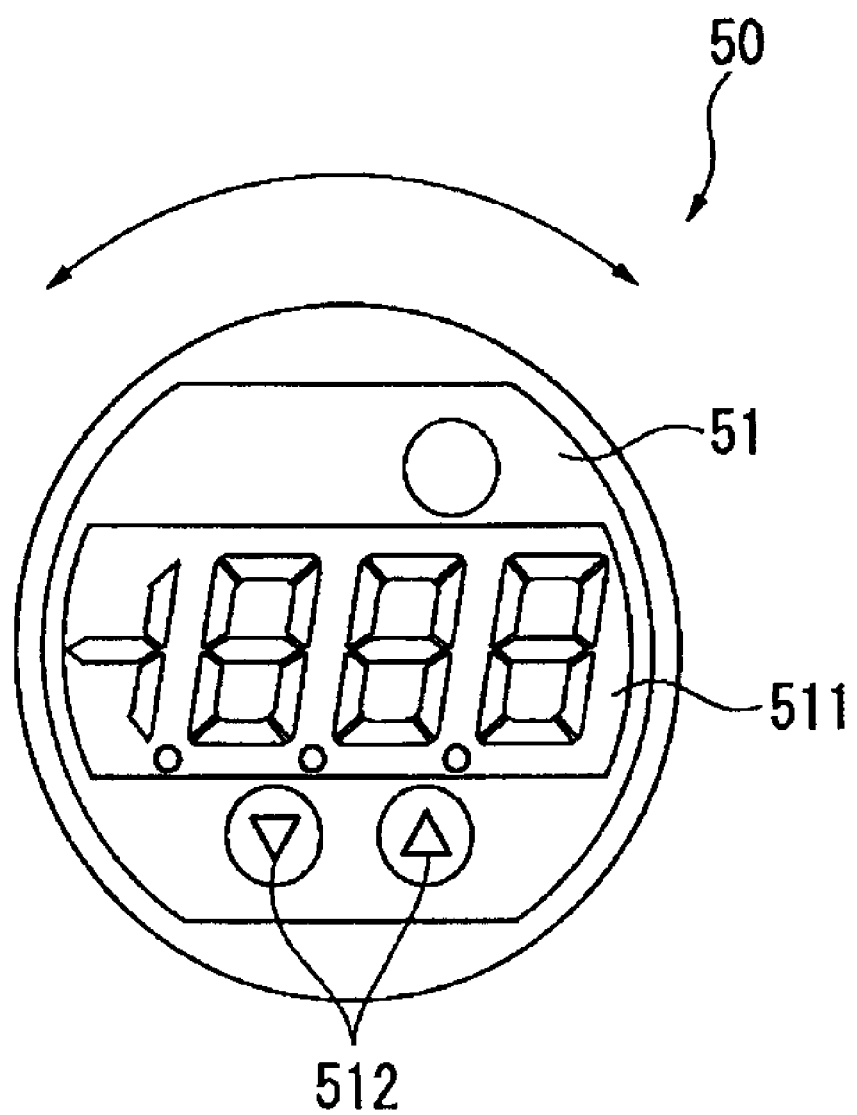
FIG. 2 is a plan view showing the detector according to the embodiment of the present invention.
Figure 3:
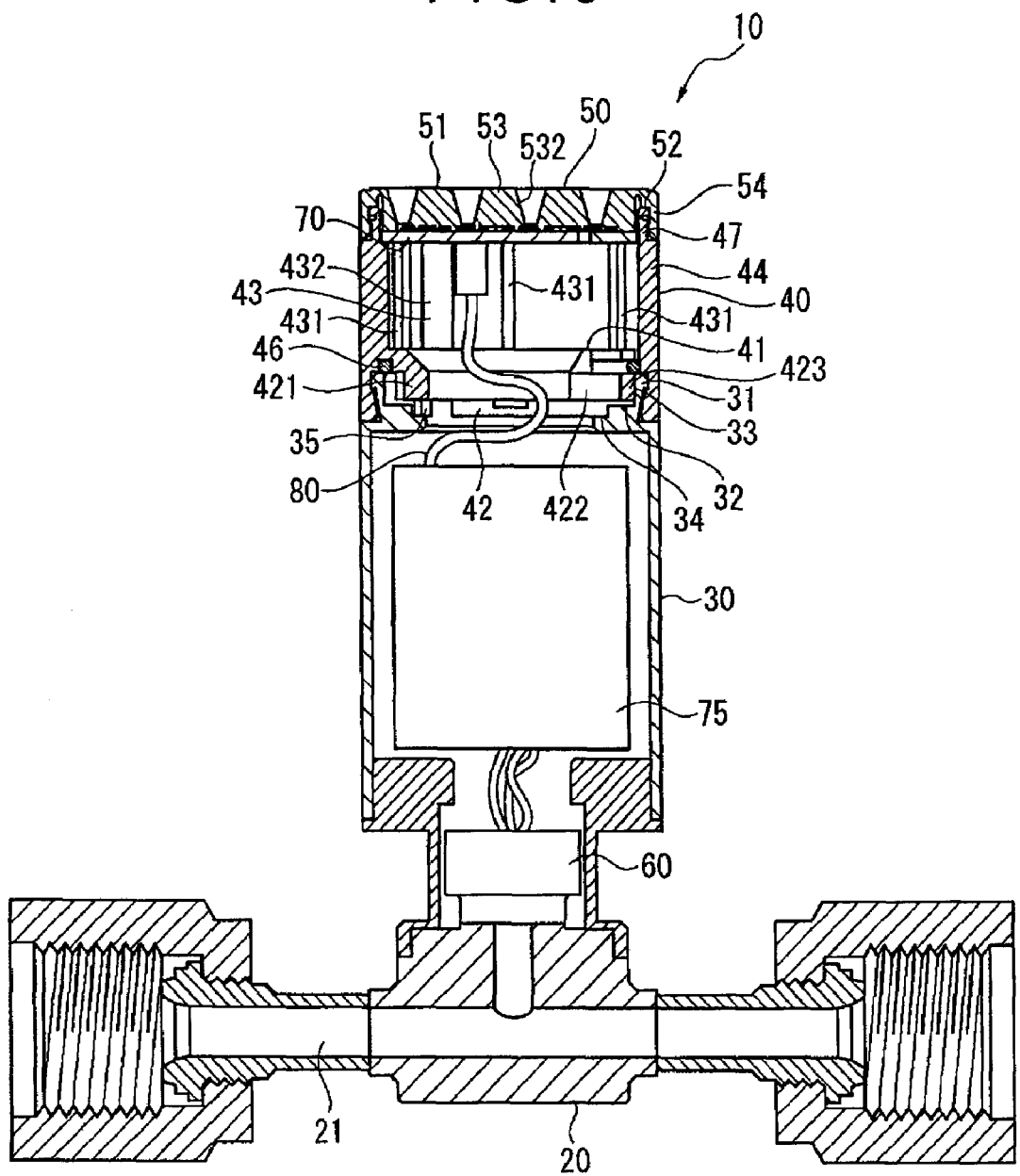
FIG. 3 is a cross sectional view showing the detector shown in FIG. 1.
Figure 4:
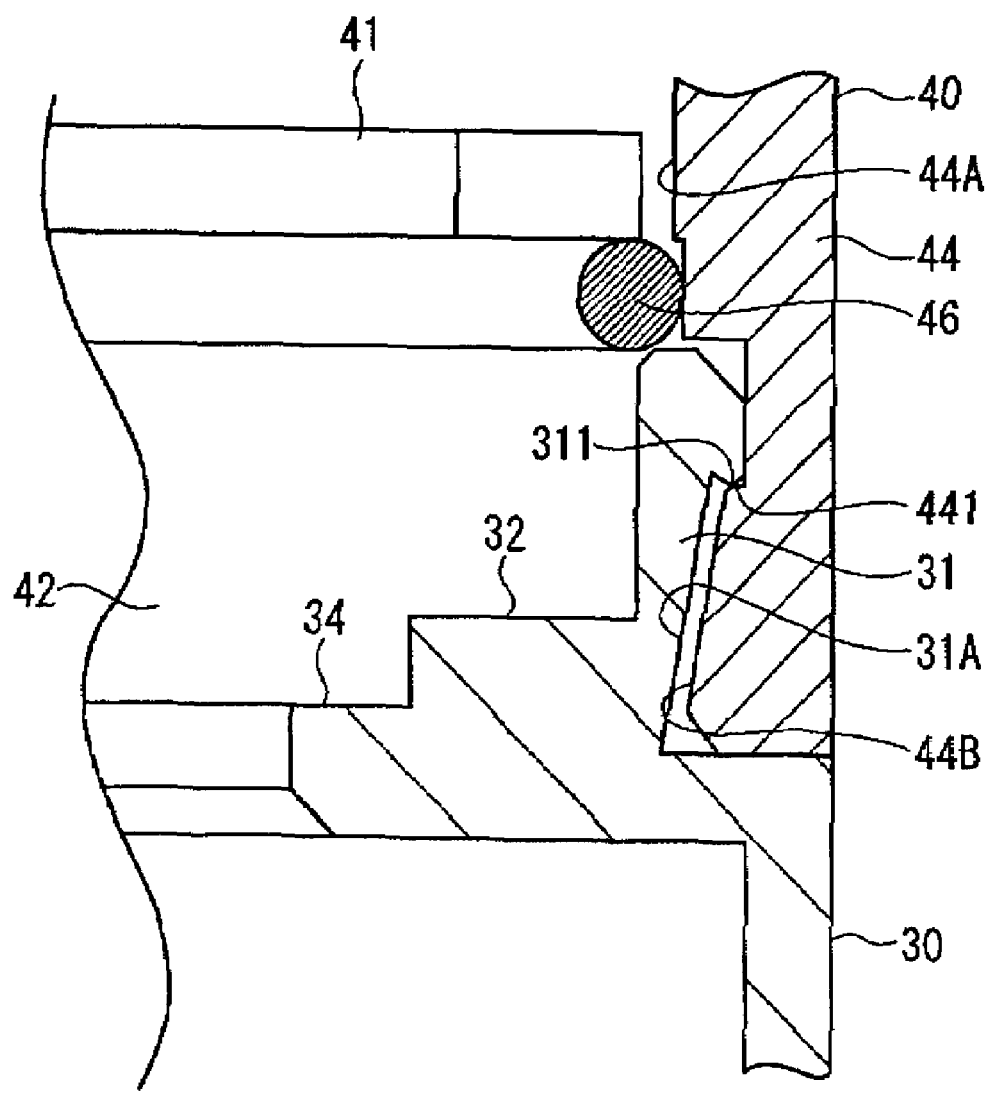
FIG. 4 is an enlarged view showing a primary portion of FIG. 3.
Figure 5:
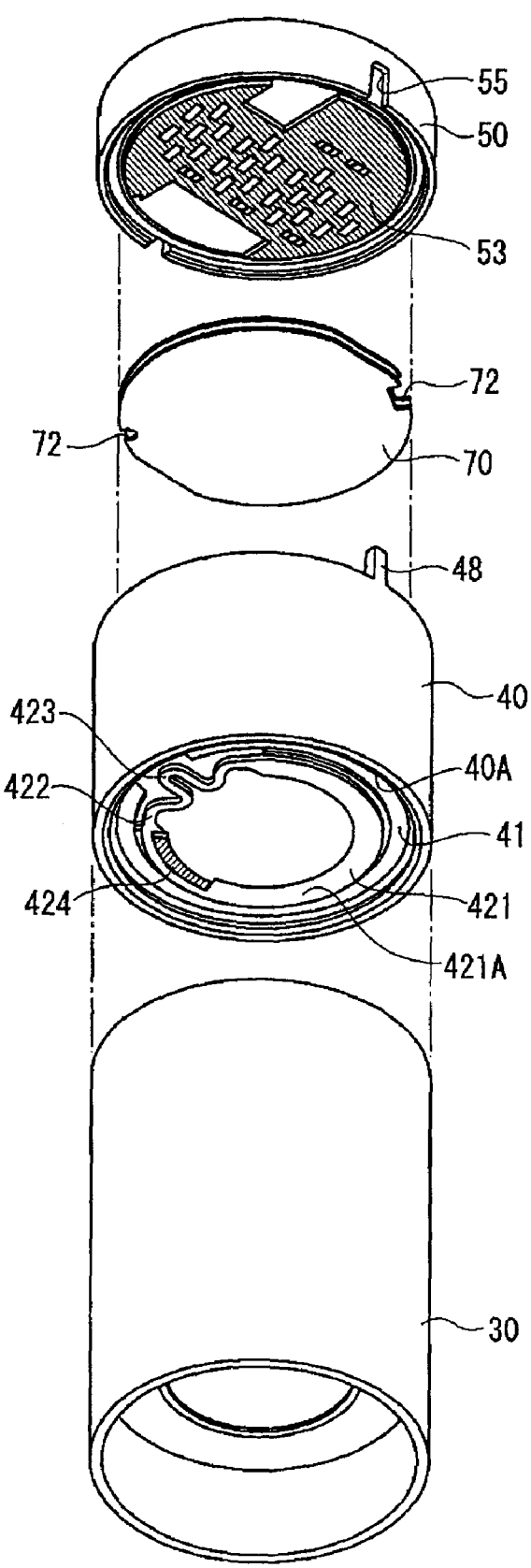
FIG. 5 is an exploded perspective view showing a rear side of the detector according to the embodiment of the present invention.
Figure 6:
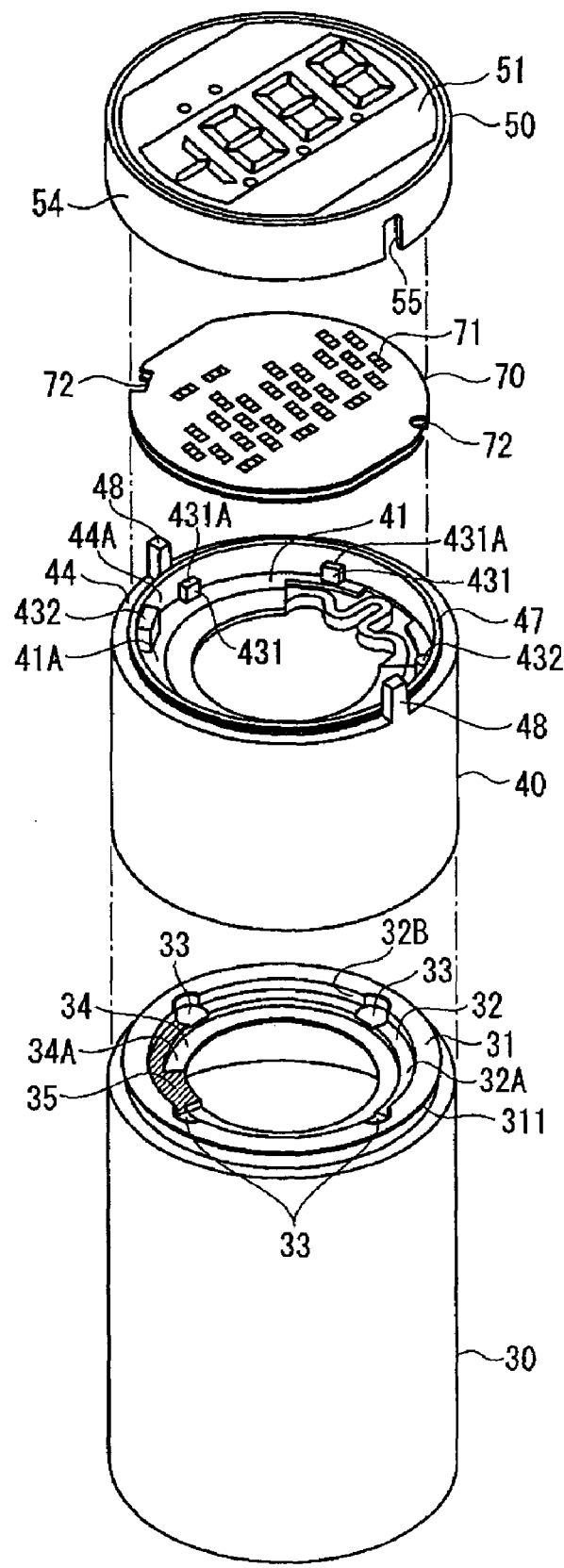
FIG. 6 is an exploded perspective view showing an upper side of the detector according to the embodiment of the present invention.
Figure 7:
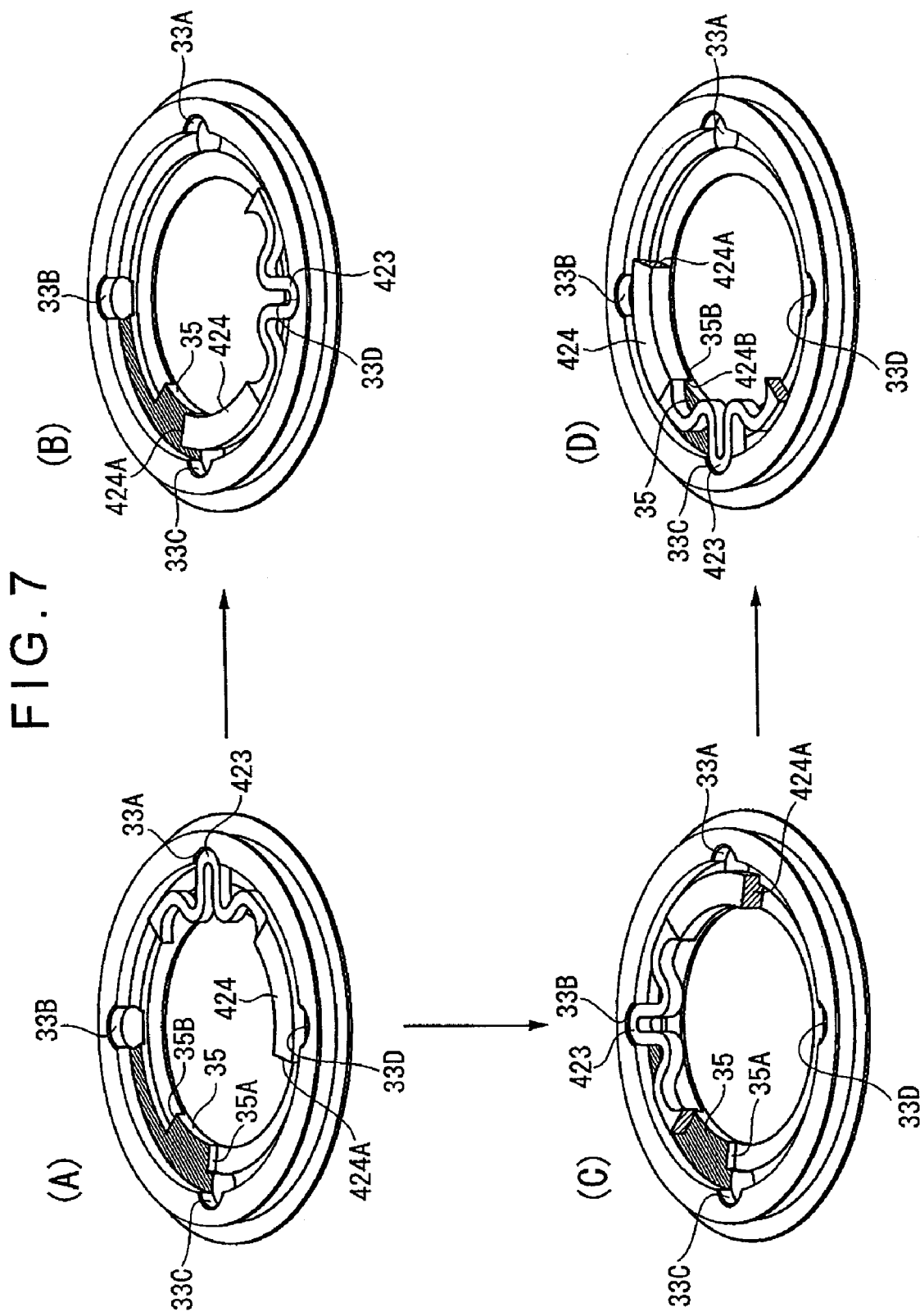
FIG. 7 is a perspective view showing an aspect of rotation according to the embodiment of the present invention.
Figure 8:
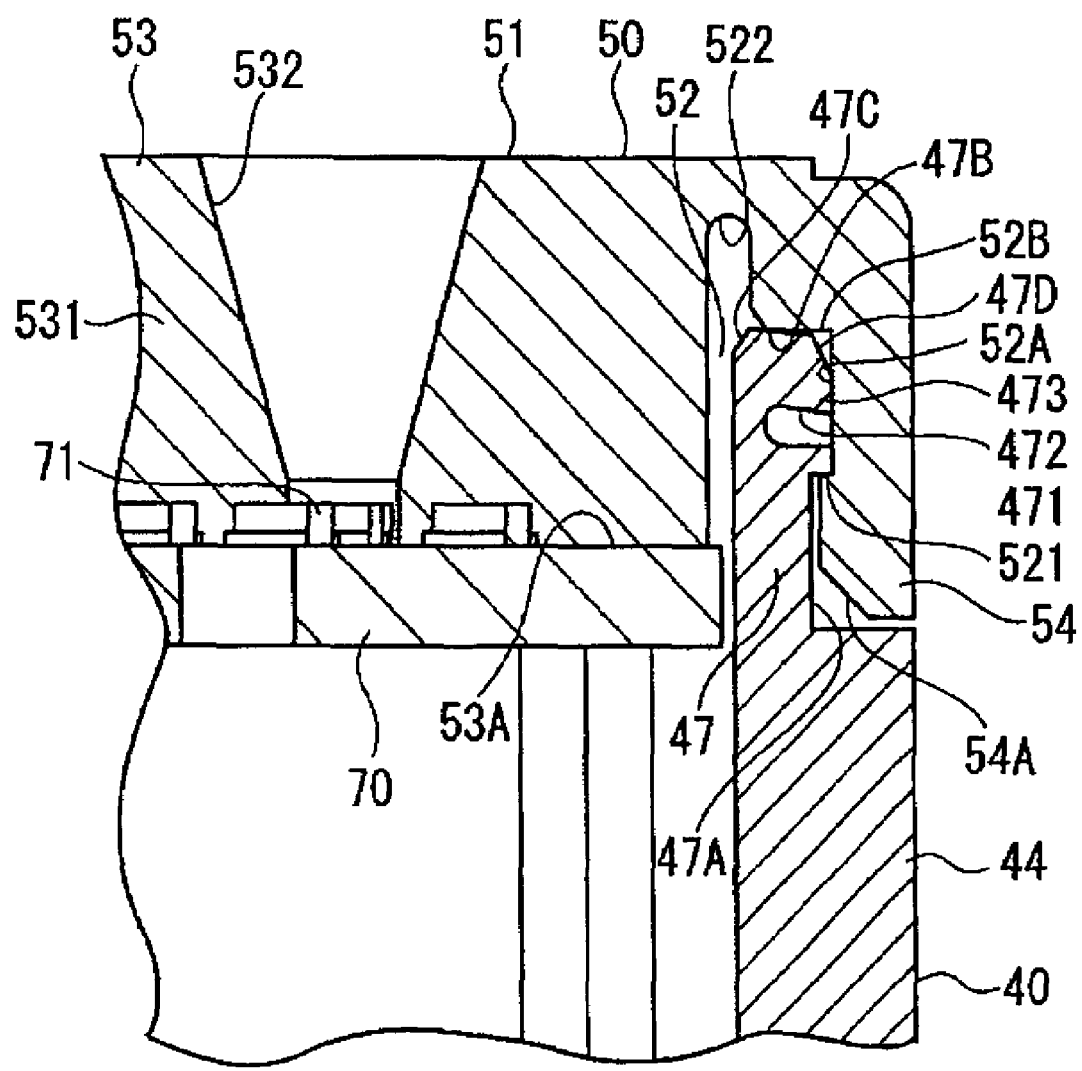
FIG. 8 is an enlarged view showing a primary portion of FIG. 3.

FIG. 1 is a front view showing a detector according to an embodiment of the present invention. FIG. 2 is a plan view showing a detector according to an embodiment of the present invention. FIG. 3 is a cross sectional view showing a detector according to FIG. 1. FIG. 4 is an enlarged view showing a primary portion of FIG. 3. FIG. 5 is an exploded perspective view showing a rear side of a detector according to an embodiment of the present invention. FIG. 6 is an exploded perspective view showing an upper side of a detector according to an embodiment of the present invention. FIG. 7 is a perspective view showing an aspect of rotation according to an embodiment of the present invention. FIG. 8 is an enlarged view showing a primary portion of FIG. 3.

FIGS. 1 and 2 show an appearance of a detector 10 according to the present embodiment. The detector 10 is, for example, a pressure gauge. The main components of the detector 10 are: a joint 20 mounted on a fluid pipe (not shown); a case 30 mounted on the joint 20; a holder 40 mounted on the case 30; and a cover 50 mounted on the holder 40. Provided on an end surface of the cover 50 is a display 51 displaying a detected pressure and having a display element 511 and a setting switch 512 (FIG. 2). The joint 20 is for connecting to pipes and is provided with a pipe hole 21 for delivering a fluid (FIG. 1). However, the joint 20, not limited to this, may be a general piping joint.

In the detector 10, as shown in FIG. 3, a sensor 60 for detecting fluid pressure is housed in the case 30. The sensor 60 is connected to a circuit board 70 housed in the holder 40 by a wire 80 via a circuit board 75 for amplifying the detected value. The circuit board 70 has on it LED(Light Emitting Diode) chips 71 which make up with a light-shielding plate 53 a segment display of a detected physical quantity.

Incidentally, the pressure may be detected using an electrostatic capacitance sensor, or, alternatively, may be detected using a semiconductor strain gauge. Further, the detector 10 may be other detectors such as a thermometer and a flowmeter.

Next, arrangements of each component will be described in detail.

The border portion 41 is provided approximately at the center of the holder 40 to define a rotation member 42 on the side of the case 30 and a fixing portion 43 on the side of the cover 50.

First, an arrangement of the rotation member 42 of the holder 40 and the case 30 is described.

1. Arrangement of Rotation Member 42 of Holder 40 and Arrangement of Case 30

As shown in FIG. 4, in the rotation member 42 of the holder 40, a first locking portion 441 shaped by denting an inner circumferential surface 44A of an exterior wall 44, is formed over the entire circumference and a locking surface 44B inclined to the center of the holder 40 from the first locking portion 441 toward the end of the inner circumferential surface 44A is provided.

On the other hand, an annular first locking lug 31 having an outer circumferential surface 31A inclined along the locking surface 44B of the holder 40 is provided on the case 30. In the first locking lug 31, a first locking portion 311 engaging with the first locking portion 441 of the holder 40 is formed on the entire circumference of the case 30.

In addition, as shown in FIG. 5, an annular first lug 421 projecting toward the case 30 is integrally formed on the border portion 41 of the holder 40. Further, a curved leaf spring 422 is integrally formed on the circumference of the first lug 421. Although any resilient member may be used in place of the leaf spring 422, a leaf spring is used in the present embodiment. The leaf spring 422 includes a projection 423 projecting radially outward.

In addition, a part of an end surface 421A of the first lug 421 further projects along an inner circumference thereof to provide a rotation restrainer 424. In the present embodiment, the rotation restrainer 424 is dimensioned to define an arc of sixty degrees.

On the other hand, as shown in FIG. 6, in the case 30, a first recess 32 to be fitted with the first lug 421 is disposed on the inner circumferential side of the annular first locking lug 31 extending over the entire circumference, and grooves 33 are formed at each ninety degrees on a bottom surface 32A and an inner wall surface 32B of the first recess 32.

Further, an annular second recess 34 dented relative to the bottom surface 32A of the first recess 32 is provided to the inner circumferential side of the first recess 32. A riser portion 35 is provided on the second recess 34, which rises from a bottom surface 34A of the second recess 34 to the bottom surface 32A of the first recess 32. According to the present embodiment, the riser portion 35 is dimensioned to define an arc of thirty degrees.

Next, how to attach the holder 40 to the case 30 and a rotary movement are described.

2. How to Attach Case 30 to Holder 40

The first locking portion 311 of the case 30 and the first locking portion 441 of the holder 40 engage with each other. Therefore, the holder 40 can be attached to the case 30 by press fitting. In addition, according to the present embodiment, since the locking surface 44B of the exterior wall 44 is inclined toward the center, it is not easily disengageable once being engaged and is possible to maintain the engagement more steadily.

In such engagement, the case 30 and the holder 40 are secured only with respect to the axial direction, and no member to restrain the holder 40 from moving in the rotary direction is provided.

As described above, when the holder 40 is attached to the case 30, the first lug 421 of the holder 40 is engaged with the first recess 32 of the case 30 and can be rotated on the first recess 32. Further, the groove 33 of the first recess 32 and the projection 423 of the first lug 421 fit with each other to hold the angle at the position of the groove 33. Since four grooves 33 are provided at four sections on the first recess 32 every ninety degrees, the attitude of the holder can be held at each ninety-degree angle.

In addition, insertion of an O-ring 46 between the case 30 and the holder 40 gives massive feeling upon rotation.

Further, the rotation restrainer 424 provided to the first lug 421 rotates on the second recess 34. Since the riser portion 35 is provided to the second recess 34, the rotation restrainer 424 collides with the riser portion 35 to regulate further rotation of the holder 40.

In the present embodiment, rotation of two hundred seventy degrees is possible since the rotation restrainer 424 is dimensioned to define an arc of sixty degrees and the riser portion 35 is dimensioned to define an arc of thirty degrees 3. Rotary Movement FIG. 7 shows an aspect of rotation. FIG. 7(A) shows an initial position at which the projection 423 is fitted with a groove 33A. FIG. 7(B) shows the projection 423 rotated clockwise by ninety degrees to fit with a groove 33D. At this time, the rotation restrainer 424 collides with the riser portion 35, where the end surface 424A of the rotation restrainer 424 is in contact with an end surface 35A of the riser portion 35 to prohibit further rotation.

FIG. 7(C) shows the projection 423 rotated from the initial position (A) counterclockwise by ninety degrees to fit with a groove 33B. FIG. 7(D) shows the projection 423 rotated counterclockwise further by ninety degrees to fit with a groove 33C. The rotation causes collision of the rotation restrainer 424 and the riser portion 35, the contact of an end surface 424B of the rotation restrainer 424 and an end surface 35B of the riser portion 35 not allowing further rotation.

Next, how the circuit board 70 is fixed with the fixing portion 43 of the holder 40 and the cover 50 will be described.

4. Arrangement of Fixing Portion 43 of Holder 40 and Arrangement of Cover 50

As shown in FIG. 6, a plurality of rectangular circuit board platforms 431 are provided on the fixing portion 43 of the holder 40, projecting from the surface 41A of the border portion 41 that faces the cover 50 and from the inner circumferential surface 44A. Although any number of the circuit board platforms 431 may be provided as far as the circuit board 70 can be held, seven platforms are provided in the present embodiment.

A circuit board fixing lug 432 also projects from the surface 41A of the border portion 41 and the inner circumferential surface 44A. The axial length of the circuit board fixing lug 432 is larger than that of the circuit board platform 431 and the circuit board 70 combined. The circuit board fixing lug 432 fits with a notch 72 provided on the periphery of the circuit board 70.

Although any number of fittings provided by the circuit board fixing lug 432 and the notch 72 of the circuit board 70 may be formed, the present embodiment includes two such fittings, different in size.

As shown in FIG. 8, the holder 40 has all over the inner circumference of the exterior wall 44 a second locking lug 47 projecting toward the cover 50. A second locking portion 471 that engages with the cover 50 is provided on an outer circumferential surface 47A of the second locking lug 47, and a stress relief groove 472 is also provided on the surface 47A, closer to the tip. Corners of a distal portion 473 of the second locking lug 47 that touch the second locking notch 52 of the cover 50 in assembling the holder 40 and the cover 50 are chamfered to form chamfered portions 47C and 47D.

On the other hand, a second locking notch 52 is provided on the cover 50 to be fitted with the second locking lug 47 of the holder 40. The second locking notch 52 has on an outer circumferential surface 52A a second locking portion 521 that engages with the second locking portion 471 and on an end surface 52B a stress relief groove 522. Corners of a distal portion of an exterior wall 54 of the second locking notch 52 that touch the second locking lug 47 of the holder 40 in assembling the holder 40 and the cover 50 are chamfered to form a chamfered portion 54A.

The light-shielding plate 53 is integrally formed on the cover 50 to make up a segment display with LED chips 71 on the circuit board 70. The light-shielding plate 53 has light-shielding walls 531 to prevent light interference of a plurality of LED chips 71 and optical path holes 532 to form segment letters by the light emitted by the LED chips 71. Each LED chip 71 is provided with the light shielding wall 531 and the optical path hole 532, and light emission of an LED chip 71 makes up a portion of a segment letter, a combination of a plurality of which makes up a readable digital display.

The exterior wall 44 of the holder 40 and the exterior wall 54 of the cover 50 have a fixing lug and notch that fit with each other. The fixing notch may be provided either to the holder 40 or to the cover 50 with a corresponding lug provided to the other. A plurality of sets of the fixing portions may be provided. The present embodiment includes in the holder 40 two fixing lugs 48, different in size. The cover 50 includes two fixing notches 55 that fit with the two fixing lugs 48.

5. How to Attach Holder 40 and Cover 50 and Securing of Circuit Board 70

First, the notch 72 of the circuit board 70 is fitted with the corresponding circuit board fixing lug 432 of the holder 40, and the circuit board 70 is closely contacted to a surface 431A of the circuit board platform 431.

Next, with a planar portion 53A of the light-shielding plate 53 of the cover 50 pushing down the circuit board 70, the cover 50 is press-fitted into the holder 40 in a manner that the second locking lug 47 of the holder 40 and the second locking notch 52 of the cover 50 is fitted with each other. As a result, the second locking portion 471 and the second locking portion 521 are locked thereby attaching the cover 50 to the holder 40. At the same time, an end surface 47B of the second locking lug 47 and the end surface 52B of the second locking notch 52 are closely contacted, and the second locking lug 47, bent by the force applied when the cover 50 is press-fitted, remain as such. When the light-shielding plate 53 of the cover 50 presses down the circuit board 70, the stress relief groove 522 is bent to relieve the stress applied on the circuit board 70.

In this way, the circuit board 70 is kept sandwiched by the circuit board platform 431 of the holder 40 and the light-shielding plate 53 of the cover 50.

The above described embodiment has following functions and effects.

(1) The leaf spring 422 provided to the first lug 421 of the holder 40 has a projection 423 projecting radially outward and the first recess 32 of the case 30 has a groove 33 that fits with the projection 423, so that, when the first lug 421 is rotated, the first lug 421 can be held at the position of the groove 33.

Accordingly, taking advantage of the resilience of the leaf spring 422, the holder 40 can be rotated with a click feel and held at each given angle regardless of the piping and the attaching location, so that the display 51 of the cover 50 fixed to the holder 40 can be held at a comfortable viewing angle.

In addition, since the angle is adjusted by the projection 423 made of a resilient member, large space is not needed and a compact, space-saving detector can be provided.

(2) The rotation restrainer 424 further projecting on the first lug 421 interferes with the riser portion 35 provided on the second recess 34 on the case 30 to prohibit further rotation.

Accordingly, since the rotation of the holder 40 relative to the case 30 is restricted within a predetermined range, malfunction such as disconnection of signal wiring on account of twisting can be securely prevented.

(3) The first locking portion 441 of the holder 40 and the first locking portion 311 of the case 30 are attached to each other by engaging with each other. Since it is only required to press-fit the holder 40 into the case 30 in order to attach the holder 40, the holder 40 can be easily attached without employing additional components (e.g. screw) and dedicated tools.

The locking surface 44B of the holder 40 is sloped toward the center of the holder 40, so that the holder 40 can be held in engagement more firmly.

(4) The first lug 421, the leaf spring 422, the rotation restrainer 424 and the first locking portion 441 are integrally formed on the holder 40, and the first recess 32, the groove 33, the second recess 34, the riser portion 35 and the first locking portion 311 are integrally formed on the case 30, so that no parts or dedicated tools are needed to assemble them. Therefore, manufacturing steps and components can be reduced, and manufacturing cost can be reduced.

(5) The circuit board fixing lug 432 provided on the holder 40 and the notch 72 formed on the circuit board 70 are fitted with each other to fix the circuit board 70 to the holder 40 with respect to the rotary direction.

The circuit board 70 is sandwiched by the circuit board platform 431 provided on the holder 40 and the light-shielding plate 53 of the cover 50 to be fixed with respect to the axial direction of the detector 10.

The fixing lug 48 provided on the holder 40 and the fixing notch 55 provided on the cover 50 are fitted with each other, so that the cover 50 is fixed relative to the rotary direction. At the same time, the second locking portion 471 provided to the holder 40 and the second locking portion 521 provided to the cover 50 are engaged with each other to attach the cover 50 to the holder 40. Since it is only required to press-fit the cover in order to engage the second locking portion 471 and the second locking portion 521, the cover 50 can be easily attached.

As described above, the holder 40, the circuit board 70 and the cover 50 are fitted with and fixed by each other, so that rotation of the holder 40 accompanies the rotation of the display 51.

The circuit board platform 431, the circuit board fixing lug 432, the second locking portion 471 and the fixing lug 48 are integrally formed on the holder 40, and the light-shielding plate 53, the second locking portion 521 and the fixing notch 55 are integrally formed to the cover 50, so that no parts or dedicated tools are needed to fix the circuit board 70.

Accordingly, the circuit board 70 can be readily fixed by the holder 40 and the cover 50. Manufacturing steps and parts can be reduced, and manufacturing cost can be reduced.

(6) In this embodiment, two circuit board fixing lugs 432 different in shape are formed to fit with the notches 72 having corresponding shapes. Since each of the two circuit board fixing lugs 432 has a shape different from the other, the circuit board 70 can only be unidirectionally mounted.

Thus, positioning of the circuit board 70 can be facilitated to securely prevent the display from being wrongly directed.

(7) Since the shape or the size of each of the two fixing notches 55 provided on the cover 50 to be respectively fitted with the two fixing lugs 48 provided on the holder 40 is different, the cover 50 can only be unilaterally mounted.

Thus, positioning of the cover 50 can be facilitated to unfailingly prevent the display from being wrongly directed upon attachment.

(8) In the present embodiment, since the stress relief grooves are provided to each of the holder 40 and the cover 50, the stress applied on the circuit board 70 can be relieved when the circuit board 70 is pushed by the light-shielding plate 53 of the cover 50 as the stress relief groove 522 is bent (FIG. 8).

(9) Since the chamfered portions 47C, 47D and 54A are formed on the distal portion 473 of the second locking lug 47 and the exterior wall 54 of the second locking notch 52, the second locking lug 47 and the second locking notch 52 are not easily caught with each other to allow smooth engagement of the holder 40 and the cover 50.

Incidentally, it should be appreciated that the scope of the present invention is not restricted to the above specific embodiment, but includes modifications and improvements as long as an object of the present invention can be attained. Specific structures and shapes in implementing the invention may be altered as long as an object and an advantage of the present invention can be achieved.

For example, in the present embodiment, although the projection 423 provided on the first lug 421 is annularly shaped, but not limited to this, it may be V-shaped.

Further, although the groove 33 is provided on the first recess 32 to be fitted with the projection 423 in the present embodiment, this groove 33 may not be provided at all. In this case, the resilience of the leaf spring 422 helps to push the inner wall surface 32B of the first recess 32 so that the display can be held at any position.

Further, the first lug 421 is provided to the holder 40 and the first recess 32 is provided to the case 30 in the present embodiment, however, the first notch may be provided to the holder 40 and the first lug may also be provided to the case 30 vice versa.

In addition, although two fixing lugs are provided to the holder 40 and two fixing notches are provided to the cover 50 in the present embodiment, each of a fixing lug and a fixing notch may be provided to both the holder 40 and to the cover 50 to be fitted with each other correspondingly. In a manner, the cover 50 includes both a set of a fixing lug and a fixing notch and the holder 40 also includes both a set of a fixing lug and a fixing notch to be correspondingly fitted with alternately. In this case, since the cover 50 can only be unidirectionally attached, the positioning can also be facilitated to unfailingly prevent the display from being wrongly directed upon attachment.

The priority application Number JP 2006-296201 upon which this patent application is based is hereby incorporated by reference.

What is claimed is:

1. A detector, comprising:
   a joint mounted to a fluid pipe;
   a case attached to the joint to house a sensor for detecting a fluid that flows in the pipe;
   a holder attached to the case and provided with a circuit board having a display for displaying a physical quantity of the fluid; and
   a cover attached to the holder to cover a part of a surface of the circuit board,
   wherein an annular first recess is formed on one of the case and the holder,
   wherein an annular first lug rotatably engaging with the first recess is formed on the other one of the case and the holder, and
   wherein the first lug includes a resilient member having a projection projecting radially outward, said projection being adapted to be resiliently deformed in a radial direction.

2. The detector according to claim 1,
   wherein the first recess is provided with a groove to be fitted with the projection on an inner wall surface thereof.

3. The detector according to claim 1,
   wherein the first recess includes an annular second recess at an inner wall surface thereof,
   wherein the second recess forms a riser portion rising from a bottom surface of the second recess to a bottom surface of the first recess at a part of a circumference thereof, and
   wherein the first lug is provided with a rotation restrainer projecting toward the bottom surface of the second recess at a part of the inner circumferential side.

4. The detector according to claim 1,
   wherein each of the case and the holder includes a holder-locking portion fitted with each other over each entire circumference, and
   wherein the holder is press-fitted to the case to be attached.

5. The detector according to claim 1,
wherein the holder is provided with a circuit board platform and a circuit board fixing lug which is a projection of a part of an inner wall, and
wherein the circuit board is put on the circuit board platform and the circuit board fixing lug and a notch formed along an outer circumferential side of the circuit board are fitted with each other.

6. The detector according to claim 1,
wherein each of the holder and the cover has a fixing lug and a fixing notch to be fitted with each other on each peripheral portion.

7. The detector according to claim 1,
wherein a light-shielding plate is integrally formed on the cover.

8. The detector according to claim 7,
wherein each of the case and the holder includes a cover-locking portion fitted with each other over each entire circumference,
wherein the cover is press-fitted to the holder to be attached, and
wherein the light-shielding plate and the circuit board are closely contacted with each other.

9. The detector according to claim 8,
wherein an annular groove is formed on each of a cover-locking lug of the holder and a cover-locking notch of the cover which form the cover-locking portion.

* * * * *